United States Patent Office 3,241,761
Patented Mar. 22, 1966

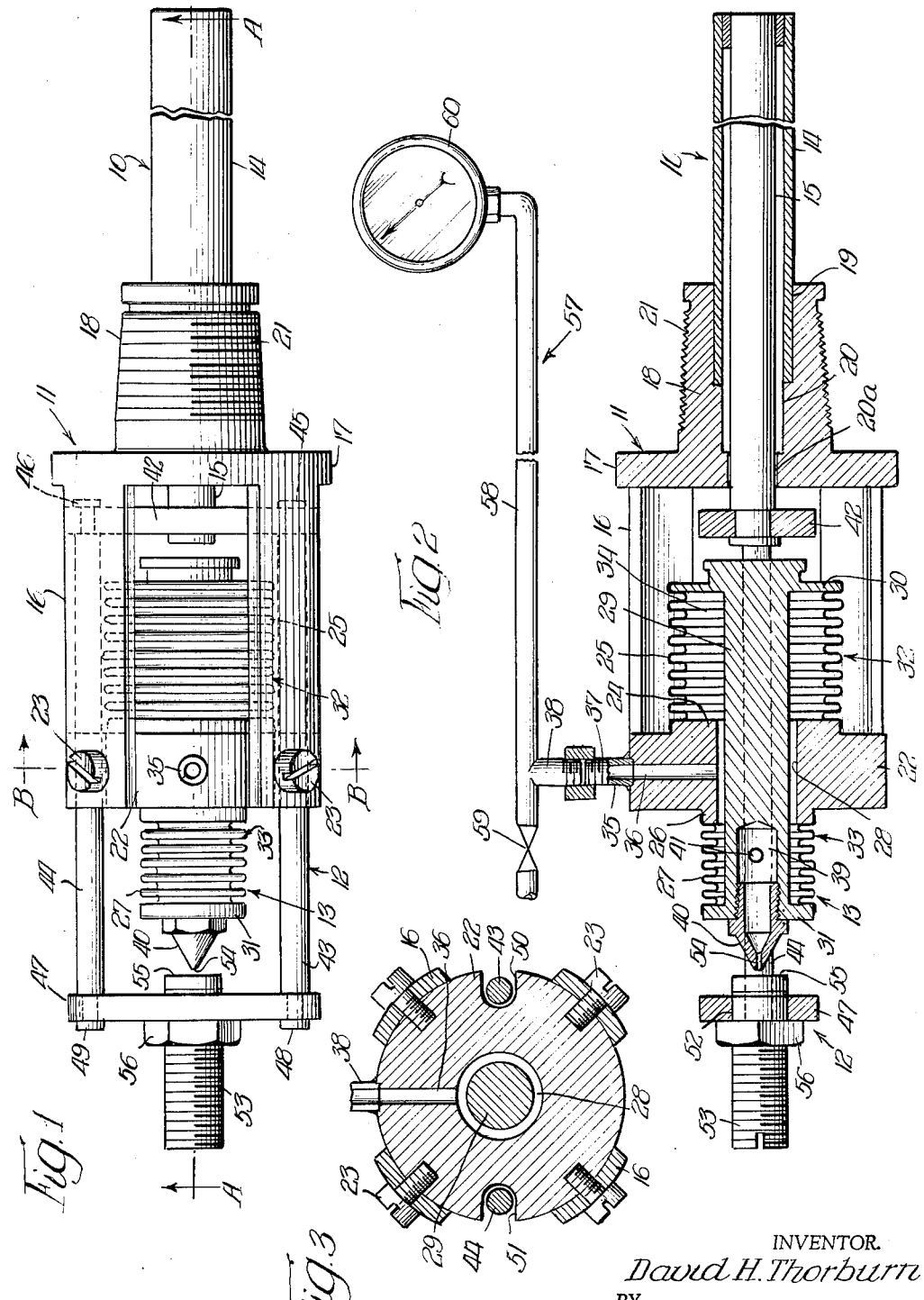

3,241,761
THERMOSTATIC PRESSURE TRANSMITTER
David H. Thorburn, Oak Park, Ill., assignor to The Powers Regulator Company, Skokie, Ill., a corporation of Illinois
Filed Jan. 6, 1964, Ser. No. 335,778
4 Claims. (Cl. 236—87)

This invention pertains to pressure transmitters. Specifically, it relates to thermostatic pressure transmitters for pneumatic heat-regulating systems.

Thermostatic pressure transmitters are employed in pneumatic heat regulating systems to provide an exhaust or bleed path of temperature-modulated flow resistance. By placing a thermostatic pressure transmitter downstream of a conventional feedline restriction, the pressure drop across the feedline restrictor and, hence, the pressure level within the conduit disposed between the feedline restriction and the pressure transmitter are caused to vary in accordance with the temperature-modulated rate of exhaust of the pressure transmitter. In this manner, a signal is elicited which is indicative of the temperature level in the particular thermal environment concerned. The pressure signal may be functionally employed as a control signal to actuate a motor valve or to register the temperature level on a pressure gauge or pressure-sensitive recorder.

It is frequently desirable to employ a bi-metallic element as the temperature-sensing means for such temperature-responsive pressure transmitters in preference to pneumatic and other types of temperature-sensing means. A bi-metallic element possesses the decided advantages of simplicity, relative permanence, reliability, and minimum hysteresis loss, i.e. minimum time lag in response to a change in temperature conditions. However, a prime problem is presented in the construction of pressure transmitters which employ bi-metallic sensing means when it becomes necessary to utilize a sensing element of extended length in order to accurately sense the average temperature condition across a hot air duct or other thermal environment container. As the length of the bi-metallic sensing element is increased, the region of contraction and expansion of the element for a given temperature range increases. The enlarged region of movement of the element renders difficult the provision of a suitable exhaust flow restricting means for the pressure transmitter. The use of linkages as levers to reduce the effective range of temperature induced movement is necessarily limited by the concomitant tendency of such devices to magnify the back-force on the bi-metallic element.

The problem presented by a larger region of contraction and expansion of the temperature-sensing element becomes readily apparent when it is desired to utilize a flapper valve mode of exhaust flow restriction. The flapper valve has been found to be particularly advantageous in relatively low-pressure pneumatic systems. However, the effective range of rate of flow regulation of a flapper valve is limited to a relatively small region of separation between the valve orifice and the flapper, generally some fraction of the diameter of the orifice opening. For example, with a valve of .02 inch in internal diameter constricted to a .006 inch orifice diameter, a pressure range of 30 p.s.i. is achieved by a .003 inch movement of the flapper relative to the valve orifice.

Accordingly, it is a primary object of the present invention to provide a thermostatic pressure transmitter in which a temperature-sensing element of extended length is accommodated in order to afford an accurate sensing of average temperature conditions across a hot air duct or other thermal environment container.

It is another object of the present invention to provide a temperature-responsive pressure transmitter in which a flapper valve mode of exhaust regulation is maintained compatibly with a relatively large region of temperature-induced expansion and contraction of the temperature sensing element.

A further object of the present invention is the provision of a temperature-responsive pressure transmitter in which an elongated bi-metallic sensing element may be employed with a minimum of hysteresis loss.

It is an additional object of the present invention to provide a thermostatic pressure transmitter which enables a broad range of temperature-pressure control relationships.

In accordance with this invention, a temperature-responsive pressure transmitter is provided which broadly comprises spring-biased pneumatic means defining an interior pressure chamber, an exhaust nozzle mounted on a movable portion of said pneumatic means and communicating with the pressure chamber, and temperature-sensitive means having a surface presenting portion disposed in spaced, opposing relationship with the exhaust nozzle.

The interior pressure chamber is adapted to be connected to a pneumatic system at a point downstream of a feedline restriction.

The temperature-sensitive means include a temperature-sensing element of sufficient length to provide an accurate indication of the temperature conditions transversely across a given thermal environment. The temperature-sensing element may be bi-metallic in nature. The surface presenting portion of the temperature-sensitive means is adapted to respond to actions of the temperature-sensing element to vary the spacing between the exhaust nozzle and the restricting surface so as to effect a flapper-valve mode of exhaust regulation.

More specifically, the temperature-sensing element is responsive to a temperature increase to cause movement of the restricting surface into closer association with the exhaust nozzle, reducing the rate of exhaust flow. The chamber pressure, accordingly, begins to increase. However, the pneumatic means, which may be an arrangement of bellows, react to attenuate the increase in pressure by causing the nozzle to move away from the restricting surface to a steady state or force equilibrium position in relation to the restricting surface. Because the pneumatic means are spring biased, the distance traveled by the nozzle is less than that traveled by the restricting surface, and the relative spacing between the restricting surface and the orifice of the exhaust nozzle is less than before the instant temperature increase. Hence, the pressure level in the chamber is greater than before the temperature increase.

In like manner, the temperature-sensing element responds to a decrease in temperature to effect movement of the restricting surface away from the nozzle orifice. In this case, the pneumatic means react to attenuate the resulting decrease in pressure by effecting movement of the nozzle toward the restricting surface. Again, the movement of the nozzle is less than the movement of the restricting surface, and the relative separation between the nozzle orifice and the restricting surface is greater than before the temperature decrease. The temperature decrease is accordingly reflected by a pressure decrease. In this manner, a temperature-modulated pressure signal is elicited in accordance with the present invention.

Further objects and advantages of the instant invention will become evident from the more particular description and from the drawings in which:

FIGURE 1 is an elevational view of a preferred embodiment of the invention;

FIGURE 2 is a cross-sectional view in elevation of the preferred embodiment taken A—A, FIGURE 1; and FIGURE 3 is a cross-sectional end view of the preferred embodiment taken at B—B, FIGURE 1.

Referring now to the drawings, there is shown a preferred form of the pressure transmitter comprising generally a temperature-sensing element 10, a housing 11, a yoke assembly 12, and a bellows assembly 13.

In the preferred embodiment of the invention, the temperature-sensing element 10 and the yoke assembly 12 comprise the temperature-sensitive means previously referred to. The temperature-sensing element itself includes a tubular member 14 which is rigidly secured at one end to the housing 11, as later described, and extends free at its opposite end for insertion into a hot air duct or other thermal environment container. The tubular member 14 is fabricated of copper or other suitable material having a relatively large coefficient of thermal expansion. An elongated rod 15 with a diameter smaller than the inner diameter of the tubular member 14 and fabricated of Invar or other suitable material having a very small coefficient of thermal expansion, is longitudinally disposed within the tubular member 14. The rod 15 is rigidly secured at one end to the outwardly extending or free end of the tubular member 11 as by welding. The opposite end of the rod 15 is rigidly secured to the yoke assembly 12, as later described.

The housing 11 includes a slotted cylindrical casing 16 integral at one end with an outwardly extending annular flange 17 of a cylindrical coupling member 18. The coupling member 18 is provided with a first partial axial bore 19 within which the inward end of the tubular member 14 is rigidly secured by force fit. A second axial bore 20 of smaller diameter than the bore 19, but larger diameter than the rod 15, provides a passageway permitting relatively unimpeded longitudinal movement of the rod 15 through the member 18. The bore 20 is provided at the end of the member 18 adjoining casing 16 with an inwardly extending annular shoulder 20a which inhibits undesired transverse movement of the rod 15 while permitting free longitudinal movement of the rod 15. The coupling member 19 is conveniently provided with an external annular-threaded portion 21 which enables the pressure transmitter to be mounted in a complementary-threaded coupling provided on a hot air duct or other thermal environment container, with the tubular member 14 extending into the interior of the duct or container.

Bellows assembly 13 includes a circular plate member 22 mounted by screws 23 in the end of the casing 16 opposite the coupling member 18. The side of the plate 22 facing the interior of the casing 16 is provided with a central annular shoulder 24 on which a first cylindrical bellows 25 is mounted. The cylindrical bellows 25 extends longitudinally toward, and in axial alignment with, the rod 15. The opposite side of the plate 22 is similarly provided with a central annular shoulder 26, of smaller exterior diameter than the annular shoulder 24, on which a second cylindrical bellows 27 is mounted. The cylindrical bellows 27 extends in axial alignment with the bellows 25 but in the opposite direction. The plate 22 is further provided with a central bore 28 through which a shaft 29 longitudinally extends. The bore 28 is sufficiently larger in diameter than the shaft 29 to permit substantially unimpeded communication of fluid medium between the bellows 25 and 27. The shaft 29 at its outer ends is provided with outwardly extending annular flanges 30 and 31 which are affixed to the free ends of the bellows 25 and 27, respectively.

The bellows 25 and 27 are fabricated of a material such as brass which permits the convoluted regions 32 and 33 to be readily formed but which is sufficiently resilient to provide each of the bellows 25 and 27 with a predetermined spring rate. It is important to note that the convoluted region 32 of the bellows 25 is of substantially larger interior diameter than that of the convoluted region 33 of the bellows 27. The bellows 25 thus presents a larger transverse surface area, upon which the longitudinal components of a given pressure condition may act, than that presented by the bellows 27.

Arranged as described, the pair of cylindrical bellows 25 and 27, mutually communicating through the bore 28, define an interior pressure chamber 34. A radial cylindrical member 35 is affixed to the rim of the plate 22 and protrudes outwardly from the plate 22 through a slotted region of the casing 16. The cylindrical member 35 communicates with the pressure chamber 34, via a radial bore 36 in the plate 22, to form an inlet port for the pressure chamber 34. The cylindrical member 35 is provided with an external annular-threaded portion 37 to permit coupling with a conduit 38 from a pneumatic system, as depicted in FIGURE 1. A partially-threaded longitudinal bore 39 in the end of shaft 29 adjoining the bellows 27 is provided to receive a complementary-threaded exhaust nozzle 40. A radial bore 41 in the shaft 29, providing communication between the pressure chamber 34 and the bore 39, completes the exhaust path from the pressure chamber 34.

The yoke assembly 12 includes a crosspiece 42 disposed interior of the casing 16 and rigidly affixed to the inner end of the rod 15. Two laterally spaced rods 43 and 44 extending perpendicular to the crosspiece 42 are affixed thereto at one end by screws 45 and 46, respectively. At their opposite end, the rods 43 and 44 are affixed to a similar crosspiece 47 by screws 48 and 49, respectively. Two opposing radial slots 50 and 51 are provided in the rim of the plate 22 at right angles to the orientation of the radial bore 36. The two slots 50 and 51 slidably embrace the rods 43 and 44, respectively. The crosspiece 47 is provided with a threaded, central bore 52 to receive a truncated, threaded rod or screw 53 which is thereby disposed in spaced, opposing axial alignment with the exhaust orifice 54 of the nozzle 40. The surface 55 of the truncated rod 53 serves as a restricting surface which controls the rate of exhaust from the nozzle 40 in dependence on the degree of separation between the surface 55 and the orifice 54. Longitudinal positioning of the rod 53 relative to the crosspiece 47 is accomplished by adjustment of the rod 53 and the locking nut 56.

By way of example, the pressure transmitter is depicted in FIGURE 1 coupled to a pneumatic temperature-indicating system 57 which includes a conduit 58 connected with the conduit 38 by a T-joint. The conduit 58 is provided on one side of the T-joint with a restriction 59 and on the opposing side with a pressure-sensitive indicating gauge 60. Upstream of the restriction 59, the conduit 58 is connected to a supply pressure source (not shown). In lieu of the indicator gauge 60, a motor valve may be conveniently connected to a conduit 55 to regulate the temperature of the thermal environment concerned. Similarly, a pressure-sensitive recorder might be substituted for the gauge 60. In every case, however, the function of the pressure transmitter relative to the system 57 is to effect variations of the pressure level in conduit 58 in response to temperature variations in the environment to which temperature-sensing tubular member 14 is exposed.

In operation, the nozzle orifice 54, through which the fluid medium of the pneumatic system is bled, coacts with the restricting surface 55 of the truncated rod 53 in the well-known manner of a flapper valve. This coaction controls the rate of exhaust flow through the nozzle 40, thereby determining the pressure drop across the restriction 59. Thus, the pressure level in the conduit 58 and in the pressure chamber 34 is dependent on the degree of separation between the restricting surface 55 and the exhaust nozzle orifice 54.

As previously mentioned, each of the bellows 25 and 27 is provided with a predetermined spring rate or force constant which may be designated, respectively, $R_{25}$ and $R_{27}$. Preferably, each of the bellows 25 and 27 is either compression or tension loaded to a degree such that the rest point, or point of zero potential energy, of each lies outside the region of travel of the shaft 29 generally. Under such circumstances, the resultant spring rate, $$R = R_{25} + R_{27}$$

is an algebraic constant which does not change value or sign over the entire region of travel of the shaft 29. In addition, it is necessary that the resultant spring bias imposed on the shaft 29 be toward the restricting surface 55.

It will be appreciated, of course, that a number of variants in terms of spring rate values, compression or tension loading, and the like are possible within the broad requirements that the bias be toward the restricting surface 55 and, preferably, the resultant spring rate be an algebraic constant over the entire region of travel. Indeed, it may well be found desirable to adapt the bellows assembly 13 to receive external springs for the purpose of modifying the resultant spring rate to meet varying temperature-pressure requirements.

The tubular member 14, protruding into the hot air duct or other thermal environment, resonds to temperature changes by longitudinally expanding with an increase in temperature and longitudinally contracting with a decrease in temperature. Upon occurrence of a temperature increase in the thermal environment concerned, the longitudinal expansion of the tubular member 14 produces a corresponding longitudinal movement of the rod 15 and the yoke asesmbly 12, urging the restricting surface 55 of truncated rod 53 into closer association with exhaust nozzle orifice 54. The tendency of such action is to produce a pressure increase in the bellows pressure chamber 34 and in the conduit 58. As the pressure level in the chamber 34 tends to increase, opposing expansion forces are exerted upon the bellows 25 and 27, respectively. Because of the larger effective surface area of the bellows 25 as compared to the bellows 27, a differential pressure force in favor of expansion of the bellows 25 is developed and exerted upon the shaft 29. The shaft 29 and its affixed exhaust nozzle 40 are thereby urged away from the restricting surface 55. The travel of the nozzle 40 away from the restricting surface 55, however, has the effect of attenuating the pressure increase in the chamber 34. The nozzle 40 travels to a new steady state or force equilibrium position relative to the restricting surface 55. The new steady state position of the nozzle 40 is reached when the differential pressure force exerted on the shaft 29 equals the opposing spring force exerted on shaft 29. The total distance traveled by the nozzle 40 is less than that traveled by the restricting surface 55. Specifically, with the distance traveled by the nozzle 40 designated as $d_N$, it is apparent that $$d_N = \frac{P_\Delta A}{R}$$

where $P_\Delta$ is the pressure change in the chamber 34 and A is the differential transverse area of the bellows 25 and 27. Accordingly, the relative spacing between the restricting surface 55 and the exhaust nozzle orifice 54 is less than before the instant temperature increase, and the pressure in chamber 34 and the connected pressure system 57 is greater than before the temperature increase.

Upon sensing a temperature decrease in the thermal environment, the tubular member 14 contracts to cause travel of the restricting surface 55 away from the exhaust nozzle orifice 54. The resulting decrease in pressure experienced in the chamber 34 permits spring-induced travel of the nozzle 40 toward the restricting surface 55 and a corresponding attenuation of the pressure decrease. The nozzle 40 again travels to a new steady state or force equilibrium position at which the spring force exerted on the shaft 29 is again equaled by the opposing differential pressure force exerted on the shaft 29. Again, the distance traveled by the nozzle 40 is less than that traveled by the restricting surface 55, and the relative separation between the exhaust nozzle orifice 54 and the restricting surface 55 is greater after the instant temperature increase than before.

With R an algebraic constant over the entire region of travel of the shaft 29, the foregoing action is uniform over the entire range of operation, and the pressure signal transmitted to the pneumatic system 57 is a direct function of the temperature conditions across the thermal environment in question. Accordingly, the gauge 60 may be calibrated directly in terms of temperature.

It should be readily apparent that, since a relatively large region of travel of the restricting surface 55 can be accommodated by the present invention, the tubular member 14 may be of extended length in order to accurately indicate the true average temperature conditions across a hot air duct or other thermal environment. Further, it is apparent that a wide and flexible range of temperature-pressure relationships may be conveniently achieved by adjustment of the truncated rod 53 and locking nut 56, modification of the spring rate R, and/or substitution of a different size exhaust nozzle 40. Finally, it is noted that these advantages are made possible consistent with minimum hysteresis loss.

Although a specific form of the invention has been disclosed in this specification, it is to be understood that this is merely by way of example and not to be construed as limiting. It will be apparent that various modifications may be made within the scope of the claims without departing from the spirit of the invention.

What is claimed is:
1. A temperature-sensing device comprising:
    (a) rigid support means;
    (b) a pair of spring-loaded, mutually-communicating, different-diameter bellows mounted on said rigid support means in opposing alignment and defining a pressure chamber provided with an inlet port adapted to be connected to a pneumatic system;
    (c) a shaft disposed longitudinally within said pair of bellows and having outwardly extending flanges at each end connected to the free end of one of said bellows;
    (d) an exhaust nozzle mounted at the end of said shaft secured to the smaller one of said pair of bellows and communicating with the pressure chamber defined by said pair of bellows;
    (e) a rigid elongated sensing element having a relatively large co-efficient of thermal expansion and mounted on said rigid support means;
    (f) a restricting member rigidly connected to said sensing element in opposing, aligned proximity of said exhaust nozzle, said sensing element being adapted, upon sensing a temperature increase, to effect straight line movement of said restricting member toward said exhaust nozzle to further restrict the rate of exhaust of said nozzle, said temperature-sensitive means being further adapted, upon sensing a temperature decrease to effect straight line movement of said restricting member away from said exhaust nozzle to reduce restriction of the rate of exhaust of said nozzle, said pair of bellows being co-axial with said restricting member such that the direction of opposing contraction and expansion of said pair of bellows is co-linear with the direction of movement of said restricting member, the bellows of smaller diameter extending toward said restricting member and the bellows of larger diameter extending in the opposite direction, said spring-loading of said pair of bellows being in the direction of said restricting member.

2. A temperature actuated pressure transmitter comprising:
    (a) a housing;

(b) a tubular member, having a relatively large coefficient of thermal expansion, affixed to said housing and protruding outwardly therefrom;
(c) a yoke slidably engaged by said housing for movement in alignment with said tubular member;
(d) a rod, having a relatively small coefficient of thermal expansion, slidably mounted in said housing and extending longitudinally within said tubular member, said rod being rigidly secured to said tubular member only at the outer end of said tubular member, said rod being further secured at its other end to said yoke;
(e) a pair of spring-biased, mutually-communicating cylindrical bellows of different diameters mounted on said housing in opposing alignment, the direction of opposing contraction and expansion of said bellows being colinear with the direction of slide of said yoke, the bellows of larger diameter extending toward the end of said yoke secured to said rod, and the bellows of smaller diameter extending in the opposite direction, said spring bias being in the direction of the bellows of smaller diameter;
(f) a shaft disposed longitudinally within said pair of bellows and having outwardly extending flanges at each end connected each to the outwardly extending end of one of said bellows:
(g) a nozzle mounted at the end of said shaft secured to the bellows of smaller diameter and arranged to exhaust outwardly from the interior of said pair of communication bellows in a direction colinear with the direction of slide of said yoke;
(h) a truncated threaded member adjustably mounted in said yoke and arranged to present a restricting surface in spaced, opposing relation with said nozzle;
(i) a pressure inlet port adapted to receive a coupling from a pressure system and to provide communication between said coupling and the interior of said pair of communicating bellows thereby completing a bleed path from said pressure system through said nozzle.

3. A temperature-sensing device comprising:
(a) rigid support means;
(b) a pair of spring-loaded mutually-communicating, different-diameter bellows mounted on said rigid support means in opposing alignment and defining a pressure chamber provided with an inlet port adapted to be connected to a pneumatic system;
(c) a shaft disposed longitudinally within said pair of bellows and connected at each end to the free end of one of said bellows;
(d) an exhaust nozzle mounted at the end of said shaft secured to the smaller one of said pair of bellows and communicating with the pressure chamber defined by said pair of bellows;
(e) temperature-sensitive means mounted on said rigid support means and provided with a rigid elongated thermal sensing element and a substantially planar surface rigidly connected to said thermal sensing element and disposed in spaced, opposing alignment with said exhaust nozzle, said temperature-sensitive means being adapted to effect straight line travel of said surface toward said exhaust nozzle upon sensing a temperature increase and to effect straight line travel of said surface away from said exhaust nozzle upon sensing a temperature decrease, said pair of bellows being co-axial with said planar surface with the bellows of smaller diameter extending toward said surface and the bellows of larger diameter extending in the opposite direction, said spring-loading of said pair of bellows being toward said surface.

4. A thermostatic pressure transmitter comprising:
(a) temperature-sensitive means provided with a rigid elongated sensing element of relatively large co-efficient of thermal expansion and restricting surface presenting member rigidly connected to said sensing element for straight line movement with expansion and contraction of said sensing element; and
(b) pneumatic means adapted to be connected to a pneumatic system and comprising a pair of bellows of different diameters disposed in pressure-communicating, opposing relationship, said pneumatic means further comprising an exhaust nozzle mounted at one end of one of said pair of bellows and in spaced, opposing relationship with said restricting surface so as to coact with said restricting surface in the manner of a flapper valve, said pair of bellows being coaxial with said restricting surface, said pair of bellows being pressure biased away from said restricting surface and spring biased toward said restricting surface, said temperature-sensitive means being responsive to a temperature increase to move said restricting surface in a straight line toward said exhaust nozzle and responsive to a temperature decrease to move said restricting surface in a straight line away from said exhaust nozzle, said pair of bellows being responsive to a pressure increase in said pneumatic system to move said exhaust nozzle away from said restricting surface and responsive to a pressure decrease in said pneumatic system to move said exhaust nozzle toward said restricting surface, in each case said movement of said exhaust nozzle being a direct function of the pressure change and the differential transverse area of said pair of bellows and an inverse function of the spring rate of said spring bias.

References Cited by the Examiner
UNITED STATES PATENTS

| | | | |
|---|---|---|---|
| 969,848 | 9/1910 | Davis | 236—87 X |
| 1,312,253 | 8/1919 | Johnson | 236—82 |
| 2,117,800 | 5/1938 | Harrison et al. | 236—82 |
| 2,331,799 | 10/1943 | Pett | 236—82 X |
| 2,411,295 | 11/1946 | Saballus et al. | 236—87 |
| 2,638,919 | 5/1953 | Clarridge. | |
| 2,732,849 | 1/1956 | Rosenberger et al. | 137—85 |
| 2,780,230 | 2/1957 | Freeman | 137—85 |

ALDEN D. STEWART, *Primary Examiner.*